United States Patent
Whynot

(10) Patent No.: US 8,548,812 B2
(45) Date of Patent: Oct. 1, 2013

(54) METHOD AND SYSTEM FOR DETECTING A RELEVANT UTTERANCE IN A VOICE SESSION

(75) Inventor: Stephen Whynot, Mckinney, TX (US)

(73) Assignee: Avaya Inc., Basking Ridge, NJ (US)

( * ) Notice: Subject to any disclaimer, the term of this patent is extended or adjusted under 35 U.S.C. 154(b) by 1086 days.

(21) Appl. No.: 12/341,246

(22) Filed: Dec. 22, 2008

(65) Prior Publication Data

US 2010/0161335 A1 Jun. 24, 2010

(51) Int. Cl.
*G10L 21/00* (2006.01)
*G10L 15/04* (2006.01)
*G10L 15/00* (2006.01)

(52) U.S. Cl.
USPC ......... 704/275; 704/270.1; 704/251; 704/231

(58) Field of Classification Search
None
See application file for complete search history.

(56) References Cited

U.S. PATENT DOCUMENTS

| | | | | |
|---|---|---|---|---|
| 4,864,623 A * | 9/1989 | Van Nes et al. | ............... | 704/275 |
| 5,761,641 A * | 6/1998 | Rozak et al. | ................... | 704/275 |
| 6,757,361 B2 * | 6/2004 | Blair et al. | ................... | 379/67.1 |
| 6,785,654 B2 * | 8/2004 | Cyr et al. | ................... | 704/270.1 |
| 7,117,159 B1 * | 10/2006 | Packingham et al. | ......... | 704/275 |
| 7,133,828 B2 * | 11/2006 | Scarano et al. | ............... | 704/251 |
| 2003/0023431 A1 * | 1/2003 | Neuberger | .................... | 704/231 |
| 2004/0042591 A1 | 3/2004 | Geppert et al. | | |
| 2004/0081293 A1 | 4/2004 | Brown et al. | | |
| 2005/0114132 A1 | 5/2005 | Hsu | | |
| 2005/0216271 A1 | 9/2005 | Konig | | |
| 2008/0082334 A1 * | 4/2008 | Watson | ......................... | 704/251 |
| 2008/0089503 A1 | 4/2008 | Crockett et al. | | |
| 2008/0208594 A1 | 8/2008 | Cross et al. | | |

OTHER PUBLICATIONS

Extended Search Report for European patent application 09839930.6 mailed Aug. 17, 2012, 5 pages.

* cited by examiner

*Primary Examiner* — Jesse Pullias
(74) *Attorney, Agent, or Firm* — Withrow & Terranova, PLLC

(57) ABSTRACT

A method and apparatus for detecting use of an utterance. A voice session including voice signals generated during a conversation between a first participant and a second participant is monitored by a speech analytics processor. The speech analytics processor detects the use of an utterance. A speech recognition processor channel selected from a pool of speech recognition processor channels and is coupled to the voice session. The speech recognition processor provided speech recognition services to a voice-enabled application. The speech recognition processor channel is then decoupled from the voice session. The speech analytics processor continues to monitor the conversation for subsequent use of the utterance.

20 Claims, 2 Drawing Sheets

METHOD AND SYSTEM FOR DETECTING A RELEVANT UTTERANCE IN A VOICE SESSION

FIELD OF THE INVENTION

The present invention relates generally to speech recognition processing, and in particular to providing speech recognition processing in response to detection of an utterance.

BACKGROUND OF THE INVENTION

A speech recognition processor uses a predefined grammar to detect words in speech. Speech recognition processors are frequently used as a front end to provide voice-enabled command and control applications. A speech recognition processor detects a word match relatively quickly, but the words that can be detected are limited to the words associated with the particular grammar. Speech recognition processors are typically not effective at or designed to detect a particular relevant word or utterance in an unbounded stream of largely irrelevant words or utterances spoken at a conventional speaking rate, as might occur during a conversation between two or more participants. Rather, a speech recognition processor typically requires a speaker to speak quite distinctly and with brief pauses between commands, because the speech recognition processor is attempting to process each separate utterance as a command. In the context of a normal conversation, coupling a speech recognition channel to the conversation would result in the speech recognition processor attempting to determine whether each spoken word matched a word in the predefined grammar, and responding with error indicators or false positive results for each word that did not match. Speech recognition processors require significant memory and processing capabilities, and in commercial settings are frequently implemented in stand-alone devices that can handle speech processing requirements for a finite number of voice sessions concurrently.

Many speech-enabled applications are front-ends to customer service systems that offer full-time availability, and thus use dedicated speech recognition processors. For example, many businesses now require a caller seeking customer service to interact with a voice-enabled application that will ask for information such as an account number and zip code, and in response provide information about the caller's account, before allowing the caller to speak to a human. Telecommunications providers are beginning to develop 'ondemand' voice-enabled applications that can be initiated by a participant in a conversation on an impromptu basis. For example, a telecommunications provider may desire to provide a subscriber the ability, at any time, to request that a third-party be invited to be joined to an existing call via a speech-enabled application. Currently, such an on-demand voice-enabled application would require that a speech recognition processor channel be dedicated to a voice session for the entire voice session. Because speech recognition processors are memory and processor intensive, it may be impractical or cost-prohibitive to simultaneously provide hundreds or even thousands of speech recognition processing channels during hundreds or thousands of voice sessions. Moreover, because speech recognition processors are not designed to select a particular relevant word out of a stream of mainly irrelevant words occurring at a conventional speaking rate, the speech recognition processor would attempt to match each irrelevant word during the conversation to a predefined grammar of commands. Since the majority of words spoken in the conversation would not match any commands in the predefined grammar, the speech recognition processor would repeatedly respond with error indicators or false positive results for each word that did not match. Thus, currently there are several problems with using speech recognition processors in on-demand voice-enabled applications.

Speech analytic processors, in contrast to speech recognition processors, are used to search for utterances, such as words or other sounds, in large quantities of recorded voice data. Speech analytic processors are not typically employed in real-time applications. A speech analytic processor typically receives a recorded voice session as input and encodes the recorded voice session into a searchable file, or database. The speech analytic processor, or associated query module, can then search for and detect designated sounds that may appear in the database. Speech analytics processors do not utilize a grammar and are capable of searching for any designated word, phrase, or sound once the database is generated and, in response to a search request, provide a time offset within the recorded voice session where such word, phrase, or sound was spoken. Speech analytics processors are extremely fast and because they are not designed to be used in a real-time environment or recognize complicated grammars, and they use significantly less processor and memory resources than a speech recognition processor.

To minimize costs associated with speech recognition processing, it would be beneficial if a speech recognition processor could be selectively allocated to a voice session after a determination has been made that a participant in the voice session desires a voice-enabled application, rather than dedicate a speech recognition processor to the voice session that may not be used during the voice session. If a speech recognition processor could be allocated on an impromptu basis, a relatively small pool of speech recognition processors could be used to support a relatively large number of voice sessions. It would be further beneficial if a speech analytics processor could be used to determine when a participant in a voice session desires an on-demand speech-enabled application, because speech analytics processors require significantly less resources than speech recognition processors.

SUMMARY OF THE INVENTION

The present invention uses a speech analytics processor to monitor a conversation for the use of an utterance, such as a hot word. Upon detection of the hot word, a speech recognition processor begins monitoring the conversation for the use of a command associated with a voice-enabled application. The speech recognition processor communicates with the voice-enabled application to provide the voice-enabled application information associated with commands spoken by a participant in the conversation. After the participant is finished using the voice-enabled application, the speech analytics processor continues to monitor the conversation for use of the hot word, and the speech recognition processor is decoupled from the conversation and is available for use by other voice sessions.

According to one embodiment of the invention, a voice session is encoded in a media stream comprising voice signals of the participants of the conversation. A speech analytics processor monitors the voice signals for use of an utterance spoken by a participant in the conversation to invoke a speech-enabled application. Upon detection of the utterance, the voice session is coupled to one of a pool of speech recognition processor channels. After the voice-enabled application is completed, the speech recognition processor channel is decoupled from the voice session and returned to the pool of speech recognition processor channels. The present invention enables a relatively small pool of speech recognition processors to be used for a relatively large number of voice sessions that may require an on-demand voice-enabled application on an impromptu basis.

According to another embodiment of the invention, a voice session carrying a conversation between first and second participants is provided to a media application server that provides one or more on-demand voice-enabled applications to the participants in the conversation. The voice session is monitored by a speech analytics processor running on the media application server. During the conversation, the first participant desires to invite a third participant to the voice session. The first participant speaks a hot word, the speech analytics processor detects the use of the hot word, and the of speech analytics processor notifies a control system associated with the media application server thereof. The media application server is coupled to a speech recognition processor having a plurality of speech recognition processor channels. The media application server obtains a speech recognition processor channel from the pool of speech recognition processor channels, and couples the speech recognition processor channel to the voice session. The voice-enabled application provides the speech recognition processor a grammar for recognizing available commands that may be spoken by the participant. The speech recognition processor awaits a command spoken by the participant. Upon recognizing a command, the speech recognition processor provides the speech-enabled application the recognized command. The speech-enabled application determines that the command relates to initiating a voice session to a third party and joining the call with the existing voice session. The speech-enabled application initiates a call to the third party, joins the call to the existing voice session, and informs the control system that the speech recognition processor channel may be returned to the pool of speech recognition processor channels. The control system returns the speech recognition processor channel to the pool of speech recognition processor channels. The control system couples the voice session, now having three participants, to the speech analytics processor for monitoring for subsequent use of the hot word by one of the participants of the conversation.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to selective use of a speech recognition processor. The present invention enables, among other advantages, providing on-demand voice-enabled applications that may be used on an impromptu basis without requiring that a relatively expensive and processor intensive speech recognition processing channel be allocated to a conversation during the entire duration of the conversation. Through the use of the present invention, a relatively small pool of speech recognition processing channels can be used to support a relatively large number of voice sessions, reducing both capital equipment expenditures and licensing fees associated with speech recognition processing channels and providing a participant in a conversation the ability to invoke the on-demand voice-enabled application while speaking at a conventional speaking rate.

Figure 1:
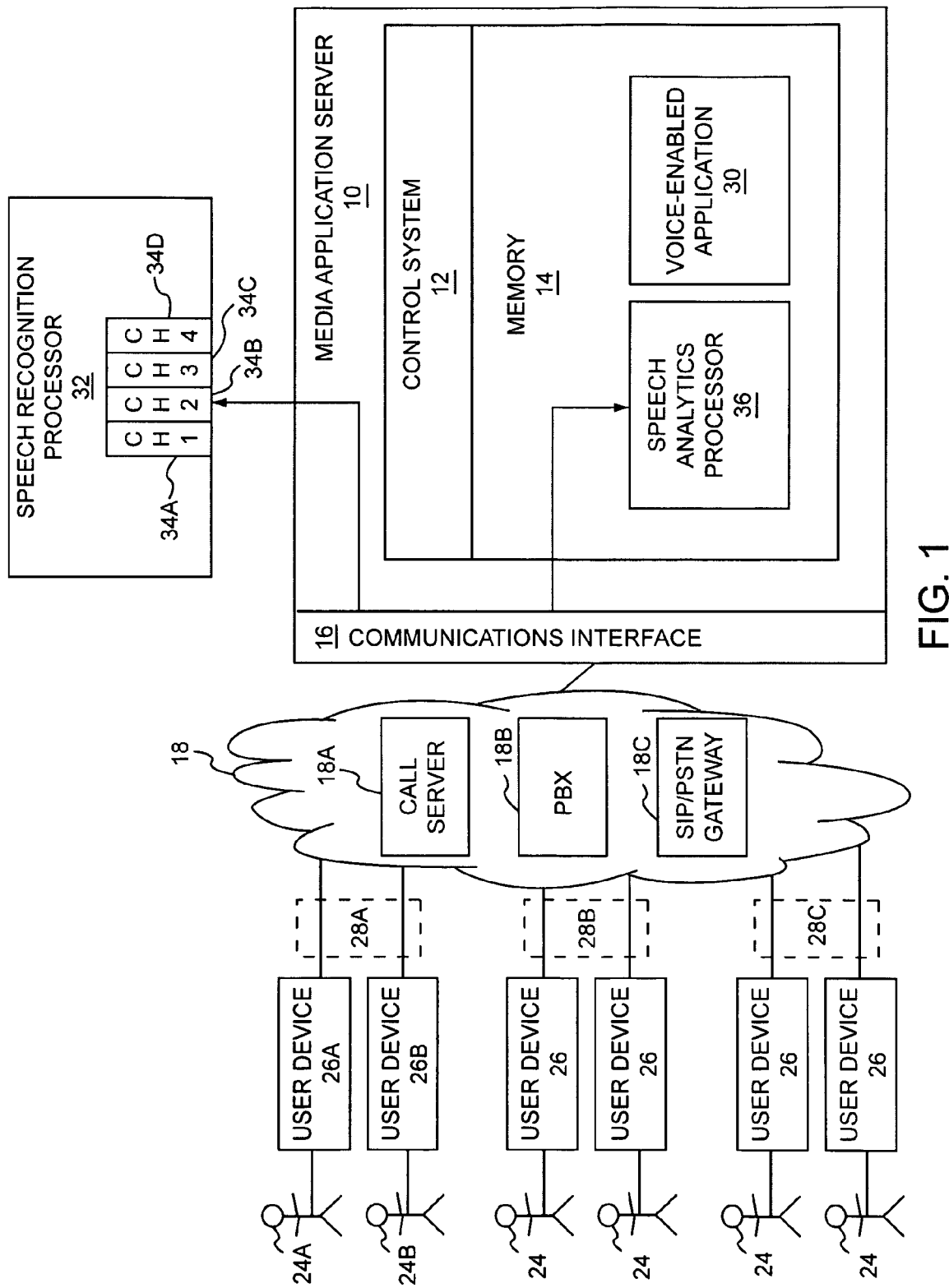
FIG. 1 is a block diagram illustrating modules for implementing one embodiment of the present invention.

FIG. 1 is a block diagram illustrating modules for implementing one embodiment of the present invention. A media application server (MAS) 10 includes a control system 12 that includes a memory 14. The MAS 10 can be a conventional or proprietary computing device, such as a computer or telecommunications server, that includes a processor capable of executing the control system 12. The control system 12 can include a conventional or proprietary operating system and additional software and hardware suitable for providing conventional operating system and telecommunications functions, such as memory management, input/output functions, and the like, as well as additional functionality as described herein. The MAS 10 also includes a communications interface 16 that is coupled to one or more telecommunications devices 18, such as a call server 18A, a private branch exchange (PBX) 18B, a Session Initiation Protocol (SIP)/Public Switched Telephone Network (PSTN) gateway 18C, and the like. Participants 24 use user devices 26 to engage in conversations with one another. The user devices 26 can comprise any suitable communications devices, such as wired, cordless, or cellular telephones, computers, personal digital assistants, and the like. The conversations between respective pairs of participants, such as the participants 24A, 24B, are established by one or more of the respective telecommunication devices 18 as a voice session, and are represented herein by voice sessions 28A, 28B, 28C. Mechanisms for setting up and tearing down voice sessions, such as the voice sessions 28A, 28B, 28C, are well known to those skilled in the art and will not be discussed herein. For purposes of illustration the voice sessions 28A, 28B, 28C may be referred to herein collectively as the voice sessions 28 where the discussion does not relate to a particular voice session 28A, 28B, or 28C.

The telecommunications devices 18 are capable of providing one or more voice sessions 28 to the MAS 10 for desired processing. The MAS 10 includes a voice-enabled application 30 that may provide functionality to a participant 24 during a voice session 28. The voice-enabled application 30 may be an 'on-demand' application. For example, the voice-enabled application 30 may not provide functionality until called upon by a participant 24 to do so. After being initiated or otherwise notified by a participant 24 that the participant 24 desires a service from the voice-enabled application 30, the voice-enabled application 30 interacts with a speech recognition processor 32 to enable the participant 24 to interact with the voice-enabled application 30 via speech commands. The speech recognition processor 32 provides speech recognition services to one or more voice-enabled applications 30 via speech recognition channels 34A-34D, one of which is allocated to a respective voice-enabled application 30 as needed.

Speech recognition processors, such as the speech recognition processor 32, are processor and memory intensive devices that utilize a defined grammar having a finite vocabulary of commands and attempt to detect the use of a command in speech in real-time. Speech recognition is a specialized technology that is frequently provided to a business by a third party that specializes in speech recognition technology. In a commercial environment, speech recognition processors are typically dedicated servers that work in conjunction with a specific application to provide an integrated voice-enabled application, or that provide a finite number of speech recognition channels for use however the business desires. Speech recognition processors are frequently licensed for use on a per channel basis, and in practice, licensing fees and equipment investment necessary to provide a speech recognition channel for a large number of voice sessions 28 is cost prohibitive. Moreover, speech recognition processors specialize in recognizing a finite number of commands and are significantly more accurate in detecting the use of a command when words are spoken slowly, distinctly, and with pauses between each word. Using a speech recognition processor to detect a single word or utterance in a stream of words would cause the speech recognition processor to attempt to match each separate word or utterance to the predefined grammar, and repeatedly respond with error indicators or false positive results for each word or utterance that did not match the predefined grammar.

The MAS 10 also includes an embedded speech analytics processor 36. By embedded, it is intended that the speech analytics processor 36 can execute on the same processor as other applications in the MAS 10. Alternately, the speech analytics processor 36 can be executed on a separate device and be coupled to the MAS 10 via a network. Speech analytic processors are designed to find occurrences of designated utterances, such as words, phrases, or other sounds, in large quantities of voice data. The process of speech analytics is sometimes referred to as data mining, and can be used, for example, by a government agency to determine if certain words were spoken during, for example, any international call that was placed on a particular day. A speech analytics processor typically receives voice signals associated with a conversation as input and encodes the voice signals into a searchable database or file. A query module can then be used to determine whether one or more words or phrases are present in the searchable database. One particular example of speech analytics software is provided by Nexidia Inc., 3565 Piedmont Road NE, Building Two, Suite 400, Atlanta, Ga. 30305, and its white paper entitled *Phonetic Search Technology*, 2007 and the references cited therein, wherein the white paper and cited references are each incorporated herein by reference in their entireties. Generally, the Nexidia speech analytics processor encodes voice signals as phonemes, and creates a phoneme-based index of the conversation. A query including a query term comprising one or more words is entered, the query term is similarly encoded as phonemes, and the phoneme-based index is used to determine if the query term is present in the searchable database. If so, the speech analytics processor can return a time offset indicating where in the voice signals the query term is present.

Unlike a speech recognition processor, a speech analytics processor is not designed to work with a complex grammar or react to a predetermined number of commands in real-time. Consequently, speech analytics processors use significantly less processor and memory than a speech recognition processor. However, speech analytics processors are very good at finding a particular utterance in a recorded conversation spoken at a conventional speaking rate. The present invention uses a speech analytics processor 36 to monitor a conversation and detect an utterance, such as a hot word, in a near real-time time frame. The drawings and examples provided herein will refer to the utterance as a hot word, but those skilled in the art will appreciate that the invention is not limited to detecting a hot word, and can be used to detect any utterance, whether it be a word, a combination of words, or other sounds. The present invention interfaces with the speech analytics processor 36 and provides the speech analytics processor 36 segments of speech as they are generated by the participants in the conversation. The precise method for providing the speech analytics processor 36 can vary depending on the particular speech analytics processor 36 used but, according to one embodiment of the invention, the speech analytics processor 36 provides an application programming interface (API) that can be called by the control system 12 to provide segments of speech to the speech analytics processor 36.

The speech analytics processor 36 processes the speech segments and determines whether the hot word is located in the speech segment. Upon detection of the hot word, the speech analytics processor 36 notifies the control system 12, which in turn interacts with the voice-enabled application 30. A speech recognition channel 34 is obtained from a pool of the speech recognition channels 34A-34D, and is coupled to the respective voice session 28 in which the hot word was detected. The speech recognition processor 32 provides voice recognition services to the voice-enabled application 30. After the voice-enabled application 30 has provided the desired function to the participants 24, the speech recognition channel 34 is returned to the pool of speech recognition channels 34A-34D. The voice session 28 continues to be monitored for subsequent use of the hot word by the speech analytics processor 36.

Figure 2:
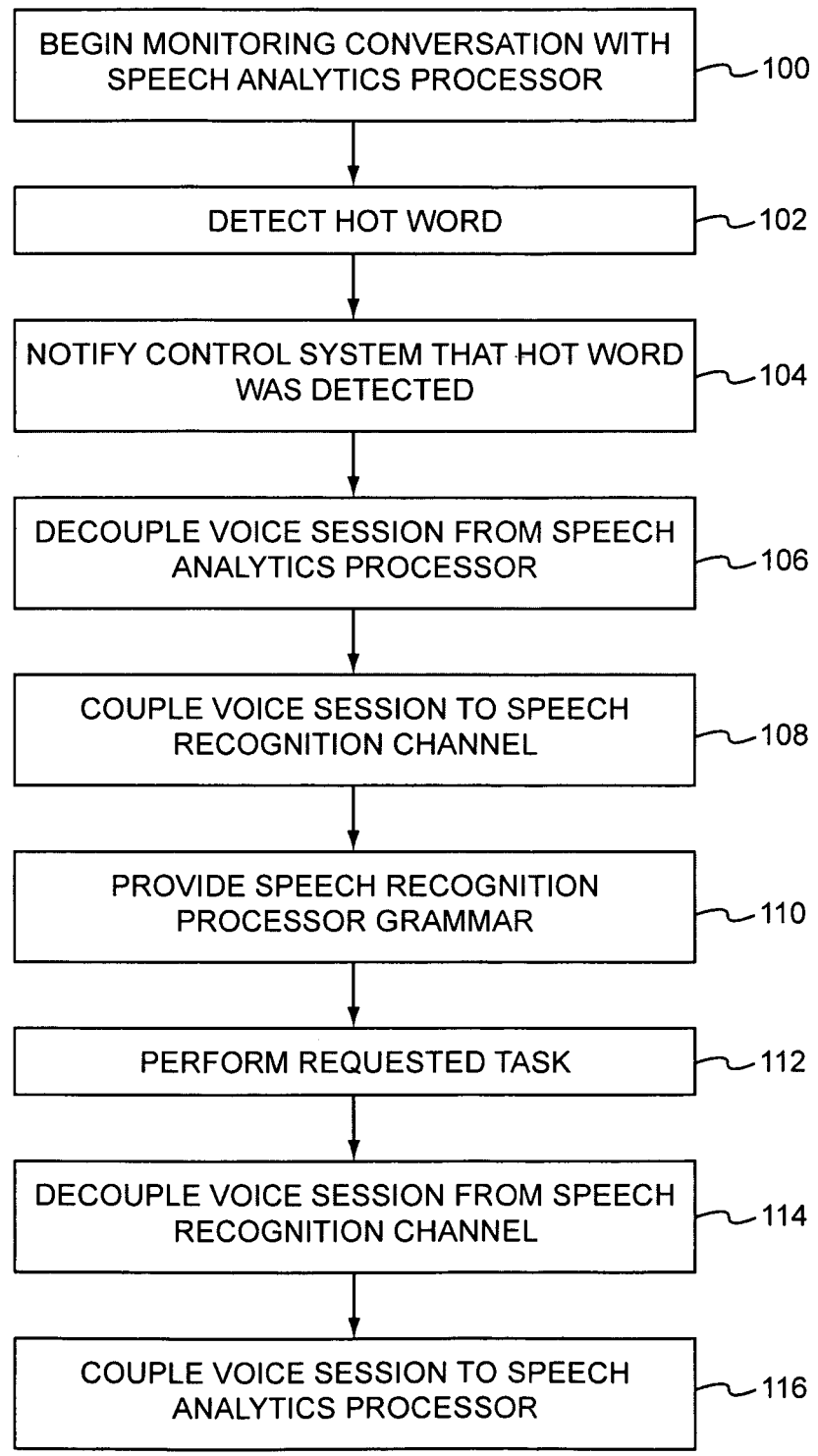
FIG. 2 is a flow chart illustrating a process for detecting an utterance during a conversation and providing a speech recognition processor channel for an on-demand voice-enabled application according to one embodiment of the invention.

FIG. 2 is a flowchart providing an example of hot word detection according to one embodiment of the present invention. For purposes of illustration, FIG. 2 will be discussed in conjunction with FIG. 1. Assume that the participant 24A and the participant 24B engage in a conversation. The voice session 28A is established between the user devices 26A and 26B by one or more telecommunications devices 18. Voice signals of the participants 24A, 24B are provided in a media stream from the respective telecommunications devices 18 to the MAS 10. The speech analytics processor 36 receives the media stream of voice signals and monitors the conversation for the use of a predetermined hot word (step 100). The predetermined hot word can be any desired word or combination of words that a participant 24 may use to initiate, invoke, or otherwise establish communications with the voice-enabled application 30. Preferably, the predetermined hot word is a word or phrase that would not normally arise in a conversation.

Assume that the participant 24B asks the participant 24A for a date of completion of a project. The participant 24A responds to the participant 24B indicating that the participant 24A cannot provide a completion date; however, another individual would be able to provide a completion date. The participant 24B suggests to the participant 24A that they attempt to initiate a telephone call with the individual and conference the individual into the existing voice session 28A. The participant 24B speaks the desired hot word, for example, 'personal agent.' The speech analytics processor 36, in conjunction with the control system 12, is continually monitoring the voice session 28A, encoding the voice signals into encoded segments of a predetermined size, and searching the encoded segments for an occurrence of the hot word. The speech analytics processor 36 detects the use of the hot word in the media stream (step 102). The speech analytics processor 36 indicates to the control system 12 that the hot word was detected associated with the voice session 28A (step 104). The control system 12 decouples the voice session 28A from the speech analytics processor 36 (step 106).

The control system 12 interfaces with the speech recognition processor 32 to obtain a speech recognition channel 34 from the pool of speech recognition channels 34A-34D. The control system 12 couples the speech recognition channel 34 to the voice session 28A (step 108). The control system 12 also initiates the voice-enabled application 30, which provides a grammar to the speech recognition processor 32 for use by the participants 24A, 24B (step 110). Alternately, the voice-enabled application 30 may be initiated at the initial establishment of the voice session 28A, and upon initiation may provide the predetermined hot word to the control system 12 for monitoring. The participant 24B is prompted for a command. The participant 24B speaks a predetermined command that is recognized by the speech recognition processor 32 and is passed to the voice-enabled application 30, which in turn initiates a call to the individual. The voice-enabled application 30, upon reaching the individual, joins the call to the voice session 28A (step 112). The voice-enabled application 30 indicates to the control system 12 that the voice-enabled application 30 is finished. The control system 12 decouples the voice session 28A from the speech recognition channel 34 (step 114). The control system 12 re-couples the speech analytics processor 36 to the voice session 28A for continued monitoring of the conversation for subsequent use of the hot word by one of the participants 24 (step 116).

The present invention thus provides a mechanism for sharing a relatively small number of speech recognition processing channels among a relatively large number of voice sessions to provide speech-enabled applications for each voice session. The present invention reduces capital equipment costs and licensing fees associated with the commercial use of speech recognition processors.

Those skilled in the art will recognize improvements and modifications to the preferred embodiments of the present invention. All such improvements and modifications are considered within the scope of the concepts disclosed herein and the claims that follow.

What is claimed is:

1. A method for monitoring a conversation comprising:
   coupling a voice session comprising voice signals generated during a conversation between a first participant and a second participant to a speech analytics processor to detect in the voice signals a use of an utterance requesting a service from a voice enabled application;
   receiving from the speech analytics processor an indication that the utterance has been detected in the voice signals and decoupling the speech analytics processor from the voice session;
   coupling the voice session to a speech recognition processor which receives a grammar comprising a plurality of commands for the voice enabled application, wherein the speech recognition processor monitors the voice session subsequent to the use of the utterance for one of the plurality of commands; and
   receiving from the speech recognition processor an indication that the one of the plurality of commands has been detected and re-coupling the speech analytics processor to the voice session.

2. The method of claim 1 wherein coupling the speech analytics processor to detect in the voice signals the use of the utterance further comprises generating, by the speech analytics processor, a phonetic index comprising phonemes associated with the voice signals, and determining if one or more phonemes in the phonetic index matches one or more phonemes associated with the utterance.

3. The method of claim 1 wherein coupling the voice session to the speech recognition processor further comprises coupling the voice session to the speech recognition processor after the utterance has been detected.

4. The method of claim 3 further comprising decoupling the speech recognition processor from the voice session.

5. The method of claim 3 wherein coupling the voice session to the speech recognition processor comprises coupling the voice session to one of a plurality of speech recognition channels associated with a pool of speech recognition channels, and wherein the one of the plurality of speech recognition channels is selected from the pool of speech recognition channels upon detecting the use of the utterance, and the one of the plurality of speech recognition channels is returned to the pool of speech recognition channels upon decoupling the one of the plurality of speech recognition channels from the voice session.

6. The method of claim 1 wherein the speech analytics processor stores a segment of the voice signals in a first memory, reduces the voice signals in the segment to a plurality of phonemes, and searches the plurality of phonemes to determine if any of the plurality of phonemes match a second plurality of phonemes associated with the utterance.

7. The method of claim 1 further comprising notifying, upon detecting the utterance, a voice-enabled application of the use of the utterance.

8. An apparatus for monitoring a conversation comprising:
   a communications interface adapted to interface with a telecommunications device; and
   a control system coupled to the communications interface and adapted to:
   couple a voice session comprising voice signals generated during a conversation between a first participant and a second participant to a speech analytics processor to detect in the voice signals a use of an utterance requesting a service from a voice enabled application;
   receive from the speech analytics processor an indication that the utterance has been detected in the voice signals and decouple the speech analytics processor from the voice session;
   couple the voice session to a speech recognition processor which receives a grammar comprising a plurality of commands for the voice enabled application, wherein the speech recognition processor monitors a media stream subsequent to the use of the utterance for one of the plurality of commands; and
   receive from the speech recognition processor an indication that the one of the plurality of commands has been detected and re-couple the speech analytics processor to the voice session.

9. The apparatus of claim 8 wherein the speech analytics processor is further adapted to generate a phonetic index comprising phonemes associated with the voice signals, and determine if one or more phonemes in the phonetic index matches one or more phonemes associated with the utterance.

10. The apparatus of claim 8 wherein to couple the media stream to the speech recognition processor the control system is further adapted to couple the voice session to the speech recognition processor after the utterance has been detected.

11. The apparatus of claim 10 wherein the control system is further adapted to decouple the speech recognition processor from the voice session.

12. The apparatus of claim 10 wherein to couple the voice session to the speech recognition processor the control system is further adapted to couple the voice session to one of a plurality of speech recognition channels associated with a pool of speech recognition channels, and wherein the one of the plurality of speech recognition channels is selected from the pool of speech recognition channels upon detecting the use of the utterance, and the one of the plurality of speech recognition channels is returned to the pool of speech recognition channels upon decoupling the one of the plurality of speech recognition channels from the voice session.

13. The apparatus of claim 8 wherein the speech analytics processor is adapted to store a segment of the voice signals in a first memory, reduce the voice signals in the segment to a plurality of phonemes, and search the plurality of phonemes to determine if any of the plurality of phonemes match a second plurality of phonemes associated with the utterance.

14. The apparatus of claim 8 wherein the control system is further adapted to notify a voice-enabled application of the use of the utterance.

15. A non-transitory computer-usable medium having computer-readable instructions stored thereon for execution by a processor to perform a method comprising:
   coupling a voice session comprising voice signals generated during a conversation between a first participant and a second participant to a speech analytics processor to detect in the voice signals a use of an utterance requesting a service from a voice enabled application;
   receiving from the speech analytics processor an indication that the utterance has been detected in the voice signals and decoupling the speech analytics processor from the voice session;
   coupling the voice session to a speech recognition processor which receives a grammar comprising a plurality of commands for the voice enabled application, wherein the speech recognition processor monitors the voice session subsequent to the use of the utterance for one of the plurality of commands; and
   receiving from the speech recognition processor an indication that the one of the plurality of commands has been detected and re-coupling the speech analytics processor to the voice session.

16. The computer-usable medium of claim 15 wherein the method further comprises coupling the speech analytics processor to detect in the voice signals the use of the utterance further comprises generating, by the speech analytics processor, a phonetic index comprising phonemes associated with the voice signals, and determining if one or more phonemes in the phonetic index matches one or more phonemes associated with the utterance.

17. The computer-usable medium of claim 15 wherein coupling the voice session to the speech recognition processor further comprises coupling the voice session to the speech recognition processor after the utterance has been detected.

18. The computer-usable medium of claim 15 wherein the method further comprises decoupling the speech recognition processor from the voice session.

19. The computer-usable medium of claim 15 wherein coupling the voice session to the speech recognition processor comprises coupling the voice session to one of a plurality of speech recognition channels associated with a pool of speech recognition channels, and wherein the one of the plurality of speech recognition channels is selected from the pool of speech recognition channels upon detecting the use of the utterance, and the one of the plurality of speech recognition channels is returned to the pool of speech recognition channels upon decoupling the one of the plurality of speech recognition channels from the voice session.

20. The computer-usable medium of claim 15 wherein the method further comprises notifying, upon detecting the utterance, a voice-enabled application of the use of the utterance.

* * * * *